(12) United States Patent
Phadke et al.

(10) Patent No.: US 9,431,900 B2
(45) Date of Patent: Aug. 30, 2016

(54) DYNAMIC OPERATING FREQUENCY CONTROL OF A BUCK POWER CONVERTER HAVING A VARIABLE VOLTAGE OUTPUT

(71) Applicant: Astec International Limited, Kowloon (HK)

(72) Inventors: Vijay Gangadhar Phadke, Pasig (PH); Yancy Fontanilla Boncato, Quezon (PH)

(73) Assignee: ASTEC INTERNATIONAL LIMITED, Kwun Tong, Kowloon (HK)

( * ) Notice: Subject to any disclaimer, the term of this patent is extended or adjusted under 35 U.S.C. 154(b) by 47 days.

(21) Appl. No.: 14/612,868

(22) Filed: Feb. 3, 2015

(65) Prior Publication Data

US 2016/0226375 A1    Aug. 4, 2016

(51) Int. Cl.
   *G05F 1/10* (2006.01)
   *H02M 3/04* (2006.01)

(52) U.S. Cl.
   CPC ..................... *H02M 3/04* (2013.01)

(58) Field of Classification Search
   CPC .............. G05F 1/10; G05F 1/12; G05F 1/46; G05F 1/455; H02M 5/2573
   USPC ....... 323/234, 237, 241, 246, 265, 273, 274, 323/275, 282, 283, 284, 285
   See application file for complete search history.

(56) References Cited

U.S. PATENT DOCUMENTS

| | | | |
|---|---|---|---|
| 5,710,697 A | 1/1998 | Cooke et al. | |
| 6,977,492 B2 | 12/2005 | Sutardja et al. | |
| 7,208,921 B2 | 4/2007 | Walters | |
| 7,339,360 B2 | 3/2008 | Chen et al. | |
| 7,667,526 B2 | 2/2010 | Chan et al. | |
| 8,120,401 B2 | 2/2012 | Kenly et al. | |
| 8,183,902 B2 | 5/2012 | Kenly et al. | |
| 8,193,798 B1 | 6/2012 | Pace et al. | |
| 8,279,631 B2 | 10/2012 | Yang | |
| 8,294,446 B2 | 10/2012 | Rice | |
| 8,421,432 B2 | 4/2013 | Hawkes | |

(Continued)

OTHER PUBLICATIONS

Gurram, Sridhar et al., "DC-to-DC Switching-Regulator Insights—Achieveing Longer Battery Life in DSP Systems," Analog Dialogue 41-12, Dec. 2007, 5 pages.

(Continued)

*Primary Examiner* — Adolf Berhane
*Assistant Examiner* — Afework Demisse
(74) *Attorney, Agent, or Firm* — Harness, Dickey & Pierce, P.L.C.

(57) ABSTRACT

A switch controller for a variable output voltage power converter includes a pulse width modulator (PWM) output producing a pulsed signal for driving a power converter switch. A mode selector output is connected to a multiplier. A period selector output is connected to the multiplier and to a PWM input. The multiplier output is connected to another PWM input. A comparator output is connected to a period selector input. The period selector outputs a nominal cycle time to the PWM when an operating on-time state is greater than a minimum operating on-time. The period selector outputs an updated cycle time greater than the nominal cycle time when the operating on-time state is less than the minimum operating on-time causing the PWM to output a pulsed signal with the updated cycle time and a duty cycle equal to a duty cycle of an immediately preceding pulsed signal.

12 Claims, 3 Drawing Sheets

(56) References Cited

U.S. PATENT DOCUMENTS

| | | | | |
|---|---|---|---|---|
| 8,541,991 B2* | 9/2013 | Lopata | ................ | H02M 3/1588 323/224 |
| 2008/0042709 A1* | 2/2008 | Chen | .................... | H02M 3/156 327/175 |
| 2009/0174379 A1* | 7/2009 | Lima | ................... | H02M 3/1588 323/282 |

OTHER PUBLICATIONS

"Single Ended PWM Controller Featuring QR Operation and Soft Frequency Foldback," NCP1205, ON Semiconductor, Dec. 2010, 17 pages.

* cited by examiner

DYNAMIC OPERATING FREQUENCY CONTROL OF A BUCK POWER CONVERTER HAVING A VARIABLE VOLTAGE OUTPUT

FIELD

The present disclosure relates to controlling the switching operating frequency of a buck or a buck-variant power converter having a variable voltage output. More specifically, the present disclosure relates to lowering the switching operating frequency while maintaining a duty cycle to prevent a continuous-mode on-time from falling below a continuous-mode minimum on-time.

BACKGROUND

The statements in this section merely provide background information related to the present disclosure and may not constitute prior art.

For a buck converter and any variants, e.g. a forward converter or a bridge converter, the operating duty cycle (D), when in continuous inductor current mode is defined as:

$$D = V_{out} \div V_{in} \quad (1)$$

where $V_{out}$ is the output voltage of the converter and $V_{in}$ is the input voltage to the converter.

For a power converter required to operate over a range of trim able output voltages, the operating duty cycle becomes very small when output voltage is set very low with respect to a nominal output.

Some current source applications demand a very low current setting compared to a nominal rating or sometimes a load impedance is unusually low. These conditions also force the output voltage to be low.

In operation a power converter has a minimum controllable operating on-time. The minimum operating on-time is affected by the resolution of a controller's pulse width modulator (PWM). However, known digital controllers have PWM resolutions down to an order of a few hundred pico-seconds and thus for most applications this will not be a design limitation. Of course, for analog control, PWM resolution is not an issue.

However, external factors such as propagation delays in circuits, buffers, drivers, and turn-on and turn-off delays in power mosfets do create a minimum controllable on-time before the power converter is forced into burst mode. Once the minimum on-time is reached and reliable operation control is lost energy balancing is used in prior art control schemes. Typically energy balancing includes supplying excess energy by operating at duty cycles above what is actually needed followed by turning the converter off to deliver a desired average effective power. During energy balancing, the control loop may be excessively slow with a converter output that has excessive ripple. The slow control loop response and excessive ripple out is unacceptable for many applications. Some examples requiring faster control loop response and low ripple include magnet drivers and super magnet where the current must pass through zero smoothly from positive to negative polarity for four quadrant operation. Another example is lab instrumentation or bench power supplies requiring output voltage and currents to be adjustable from a near zero value to a predetermined maximum value. The prior art met such needs via operation at low switching frequencies, resulting in bulky power supply designs or a linear controller is used at the cost of low power conversion efficiency. Still another example is high current multi-phase buck converters used in voltage regulator modules (VRMs) for computing and other applications. VRMs typically have a significant drop-off in efficiency as the output voltage is lowered for a given load current. It is possible to design separate VRMs for each required output to avoid the efficiency drop-off. However, VRMs have become commodity products and configurability is very important to keep manufacturing costs down by allowing for fewer SKUs (stock keeping units). Therefore, the inventors have recognized a need to maintain continuous mode and prevent the converter from being forced into burst mode at any of low output voltages, low output current, or low load relative to nominal conditions while still providing low ripple output and sufficient control loop response.

SUMMARY

Further areas of applicability will become apparent from the description provided herein. It should be understood that the description and specific examples are intended for purposes of illustration only and are not intended to limit the scope of the present disclosure.

According to one example of the present disclosure a switch controller for a power converter having a variable output voltage range may include a pulse width modulator having an output producing a pulsed signal, for driving a power converter switch. A mode selector has an output, indicative of an operating on-time state of the power converter, connected to a multiplier. A period selector has an output, indicative of a cycle time for the pulsed signal, connected to the multiplier and to an input of the pulse width modulator. The multiplier has an output, indicative of a switch on-time of the cycle time, connected to another input of the pulse width modulator. A comparator has an output, indicative of the operating on-time state relative to a minimum operating on-time, connected to an input of the period selector. The period selector outputs a nominal cycle time to the pulse width modulator when the operating on-time state is greater than the minimum operating on-time. The period selector outputs an updated cycle time greater than the nominal cycle time when the operating on-time state is less than the minimum operating on-time. In turn, the pulse width modulator outputs a pulsed signal with the updated cycle time and a duty cycle equal to a duty cycle of an immediately preceding pulsed signal.

Another example of the present disclosure is a method of controlling a switching operating frequency of a power converter having a variable output voltage range. The method includes setting a minimum operating on-time and setting a nominal switching operating frequency. Then, during operation of the power converter, determining an operating on-time state and a duty cycle state. If the determined operating on-time state is less than the minimum operating on-time, reducing the switching operating frequency and maintaining the duty cycle state.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Certain instrumentation grade and precision power supplies need to operate over relatively wide range of output voltages such as 3-12 volts (V). Other power supplies (also referred to as power converters) require a wide output voltage trimming range, e.g. 0.8-5 V and at times the power converter may be required to operate in continuous mode at output voltages near zero when the load is impedance is very low, e.g. less than 1 Ohm. Power converter operation at low output voltage levels with respect to a nominal output voltage creates control issues. One of the low output voltage control issues is the ability to maintain continuous mode as the operating on-time becomes increasingly small as the output voltage drops. Based on a variety of factors including the PWM resolution of the power converter, various propagation delays, the rise and fall times of active switches and drivers, etc., the power converter may enter burst mode to achieve an average performance and maintain the required output voltage and/or current. However, for precision applications burst mode results in unacceptable levels of output ripple and overly slow regulation response.

The disclosed example embodiments and methods below adaptively monitors an operating on-time of the power converter and changes the operating frequency (also described with respect to cycle time) of buck converters and buck variants to keep an operating on-time above a preset or predetermined minimum controllable on-time. According to one example when the minimum on-time is reached, the operating frequency is reduced (i.e., the cycle time is increased) while maintaining a current duty cycle constant. The operating frequency change process may be continuous whenever the power converter attempts to reduce the operating on-time below the set minimum on-time.

When such needed frequency change is large, e.g. hundreds of nanoseconds, the frequency change may be implemented in one or several steps depending on the application needs. For example, if an operating frequency change, from 200 to 100 kHz, is required, with an on-time of 10%, then a single period is increased from 5000 ns to 10000 ns and the on-time from 500 ns to 1000 ns. In the previous example, a single step frequency change may cause operational problems and a multiple step change from 200 to 100 kHz is recommended. However, if the operating frequency changes from 200 to 190 kHz, with the same on-time of 10%, then the single period changes by 263 ns and on-time increases by 26.3 ns and a single step frequency change may be implemented without significant negative impact on performance. Thus, the disclosed examples allow tight control for power converters by operating at relatively narrow duty cycles allowing the power converter to avoid burst mode operation and the resultant degradation of regulation response and output ripple.

The disclosed examples also may improve the efficiency of commodity VRM products designed to operate over a wide output voltage range, e.g. 0.8-5V. The prior art VRM efficiency drops significantly at the lower voltage setting compared to the higher voltage setting. Changing the switching operating frequency as the output voltage setting is lowered while maintaining a current duty cycle the power conversion efficiency may be significantly improved.

The disclosed switch controller examples may be realized using analog control; however it is believed that digital control implementation may produce comparatively better results.

This disclosure is applicable to buck and buck-variant converters (referred to as a buck converter), such as forward converter, interleaved forward converter, half and full bridge converters, etc. A common characteristic of the applicable power converters is that each has an output stage inductor for maintaining a constant output current ($I_o$) and delivering a low ripple, smooth DC voltage output ($V_o$ or $V_{out}$).

For a voltage mode control in a buck converter, the output voltage, when in continuous conduction mode (CCM) conforms to equation 1 above, without regard to circuit losses and delays.

In real applications, the power converter circuit losses and delays may result in the actual Duty Cycle (D) being higher than a value derived from equation 1. However, to simplify the explanation, equation 1 will be used and does not change the fundamental analysis of the disclosed dynamic switching frequency control disclosed. In equation 1, is the voltage at the input of the inductor and $V_{out}$ is the voltage at the output of the inductor.

When used as a constant current source a buck converter's output voltage depends almost only upon the load resistance ($R_L$). $V_{out}$ may be expressed as $$V_{out} = I_o * R_L \quad (2)$$

Obviously, $R_L$ is usually not known in advance and may change significantly during use. In some applications $R_L$ may be quite small, e.g. 1 ohm or less and perhaps as low as a 0.1 ohm or even smaller. In other applications $I_o$ may change during operation and be quite small. Combining equations 1 and 2 results in $$D = (I_o * RL)/Vin \quad (3)$$

From equation 3 it can be seen that either a low $I_o$ or $R_L$ or both may result in an operating duty cycle, D, that is very small, causing the power converter to enter into an undesired burst mode and the inherent output ripple because of the minimum on-time limitations discussed above. The disclosed examples provide circuits and methods for allowing a power converter to operate at low $V_o$ or $I_o$ levels that would otherwise cause unacceptable output characteristics of the power converter.

A minimum switch on-time, at which the power converter may stably operate in continuous mode without entering burst mode, is determined. The minimum switch on-time may be determined by any known methods such as empirical or simulated testing, or by known computations that incorporate known hardware characteristics.

Figure 1:
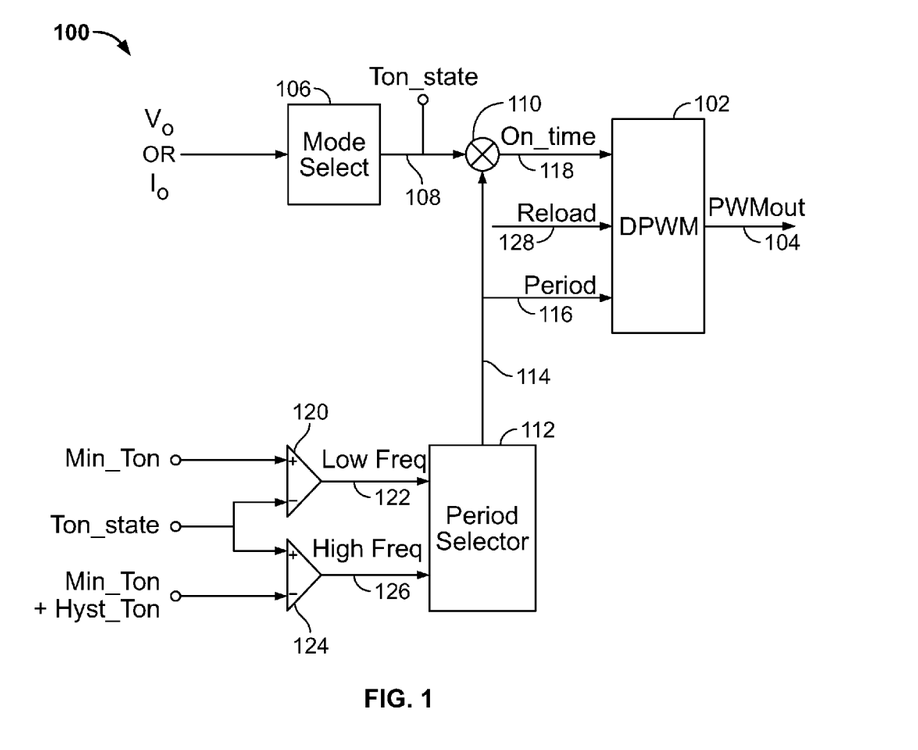
FIG. 1 is an example switch controller circuit.
Figure 2:
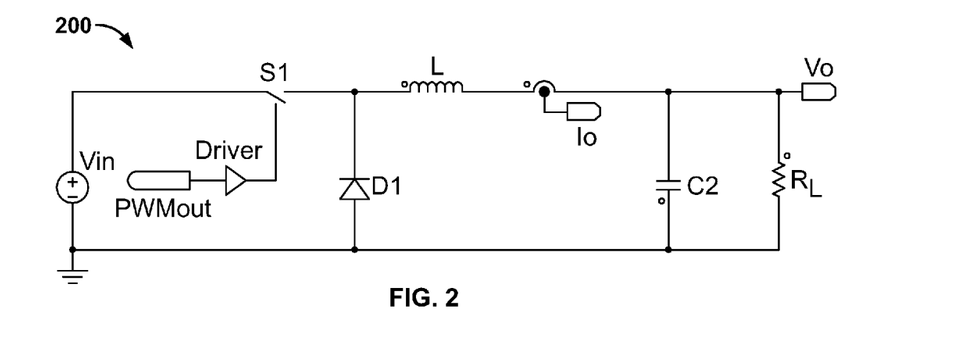
FIG. 2 is an example buck power converter circuit.

FIG. 1 shows a switch controller 100 for a power converter 200 (an example is shown in FIG. 2 below) having a variable output voltage range. A pulse width modulator 102 has an output 104 for producing a pulsed signal, $PWM_{out}$, for driving a power converter switch S1 (shown in FIG. 2 below).

A mode selector 106 has an output 108, indicative of an operating on-time state, $T_{on\_state}$, of the power converter 200, connected to a multiplier 110. The mode selector 106 may have an input that is representative of a voltage output, $V_o$, and/or a current output, $I_o$, of the power converter 200. The $V_o$ and/or $I_o$ signals may be conditioned by stability control circuits, as described in more detail below, before input to mode selector 106.

A period selector 112 has an output 114, indicative of a cycle time for the pulsed signal $PWM_{out}$, connected to the multiplier 110 and to an input 116 of the pulse width modulator 102.

The multiplier 110 has an output 118, indicative of a switch on-time of the cycle time, connected to another input of the pulse width modulator 102, as shown.

A comparator 120 has an output 122, indicative of the operating on-time state relative to a minimum operating on-time, $Min\_T_{on}$, and is connected to an input of the period selector 112, as shown. The operating on-time state $T_{on\_state}$ from output 108 is applied to one input of comparator 120 and the predetermined minimum operating on-time of the power converter 200 is applied to another input of comparator 120, as shown.

The period selector 112 outputs, at 114, a nominal cycle time (representative of a high frequency shown in FIG. 1) to the pulse width modulator 102 when the operating on-time state, $T_{on\_state}$, is greater than the minimum operating on-time, $Min\_T_{on}$. In addition, the period selector 112 outputs, at 114, an updated cycle time greater than the nominal cycle time (i.e. lowers the switch operating frequency) when the operating on-time state is less than the minimum operating on-time. The pulse width modulator 102 is designed or programmed to output, at 104, a pulsed signal with the updated cycle time and a duty cycle equal to a duty cycle of an immediately preceding pulsed signal. In this way a new longer operating on-time state is achieved. Another way to view switch controller 100 is that when comparator 120 indicates that a lower frequency is needed, the period selector 112 outputs a signal that is proportional to a ratio of the nominal switching frequency to a new lower switching frequency where this ratio changes the operating on-time and cycle time essentially instantly so that a current duty cycle is maintained. For example, if a nominal switching frequency is 200 kHz and the power converter is operating at a 10% duty cycle and the period selector causes the switching frequency to change to 100 kHz, the duty cycle is held at 10% by doubling the operating on-time at the multiplier 110 and doubling the pulse width modulator 102's cycle time at 116. The doubling at 110 and 116 occurs essentially instantly. Another example may be if the nominal switching frequency changes from 200 kHz to 170 kHz the ratio multiplier for the on-time and cycle time would be 1.176.

An operating on-time state greater than the minimum operating on-time may be achieved in a single step or in multiple steps depending on the design requirements of the intended use of the power converter. The frequency change may be implemented in any known manner. For example, the frequency may be changed by adjusting the ramp rate of the PWM oscillator and maintaining the ramp amplitude or by maintaining the ramp rate and changing the ramp amplitude. If the frequency is changed in a single step, the ramp rate corresponding to the required frequency is forced immediately. If the frequency is changed in multiple steps, the ramp rate is changed in multiple small steps until the required ramp rate corresponding to the required frequency is reached, e.g. the ramp rate may be changed in 10 ns steps. Likewise, if a one-step frequency change is implemented, the ramp amplitude corresponding to the required frequency is forced immediately, where the on-time is re-computed proportional to the new ramp amplitude. For a multiple step frequency change, the ramp amplitude may be changed in multiple small steps until the required ramp amplitude corresponding to the required frequency is reached, e.g. a 1-bit change in ramp amplitude may correspond to a 10 ns to the PWM period. Generally, the change in ramp amplitude is best implemented in digital controls, e.g. with digital PWM 100 and ramp rate change is more suitable for analog implementation.

FIG. 2 shows an example buck power converter 200 that may be used with the example switch controller 100 described above. The power converter 200 may include switch, S1, for applying an input voltage, $V_{in}$, periodically to an inductor, L, according to the $PWM_{out}$ signal from output 104. A driver or amplifier may also be used to ensure that S1 opens and closes as intended. A bias diode, D1, and a capacitor, C2, may also form a part of the converter 200, as shown and is typical of buck-type converters. $R_L$, is the load resistance, as explained above and may change significantly depending on the intended use of the power converter 200. The input signals, $V_o$ and $I_o$, for switch controller 100 are shown in FIG. 2.

As stated above, the switch controller 100 and its advantages may be realized for power converters 200 that are any of a buck converter, a forward converter, a half-bridge converter, a full-bridge converter, and an interleaved forward converter, or other variants of a buck converter.

Referring back to FIG. 1, the switch controller 100 may include an additional comparator 124 that has another output 126, indicative of the operating on-time state relative to the minimum on-time, $Min\_T_{on}$, plus a hysteresis time, $Hyst\_T_{on}$. Output 126 may be connected to another input of the period selector 112, as shown. The period selector may revert to output the nominal cycle time (nominal frequency), at 114, when the operating on-time state is greater than the minimum on-time plus the hysteresis time. The hysteresis time may be a time sufficient to compensate for any delays and switching time of the switch controller 100 and the power converter 200. Thus, the switch controller 100 normally operates at it nominal switching frequency and only decreases the switching frequency when the operating on-time state is at or near a predetermined minimum operating on-time. The time at which the switch controller 100 operates at a decreased switching frequency is kept to a minimum by the additional comparator 124.

The switch controller may further include a reload signal, at 128, applied to the pulse width modulator 104, at an end of each cycle time. This ensures that a change in cycle time, at 116, is made essentially simultaneously with a change in operating on-time state, at 108.

Figure 3:
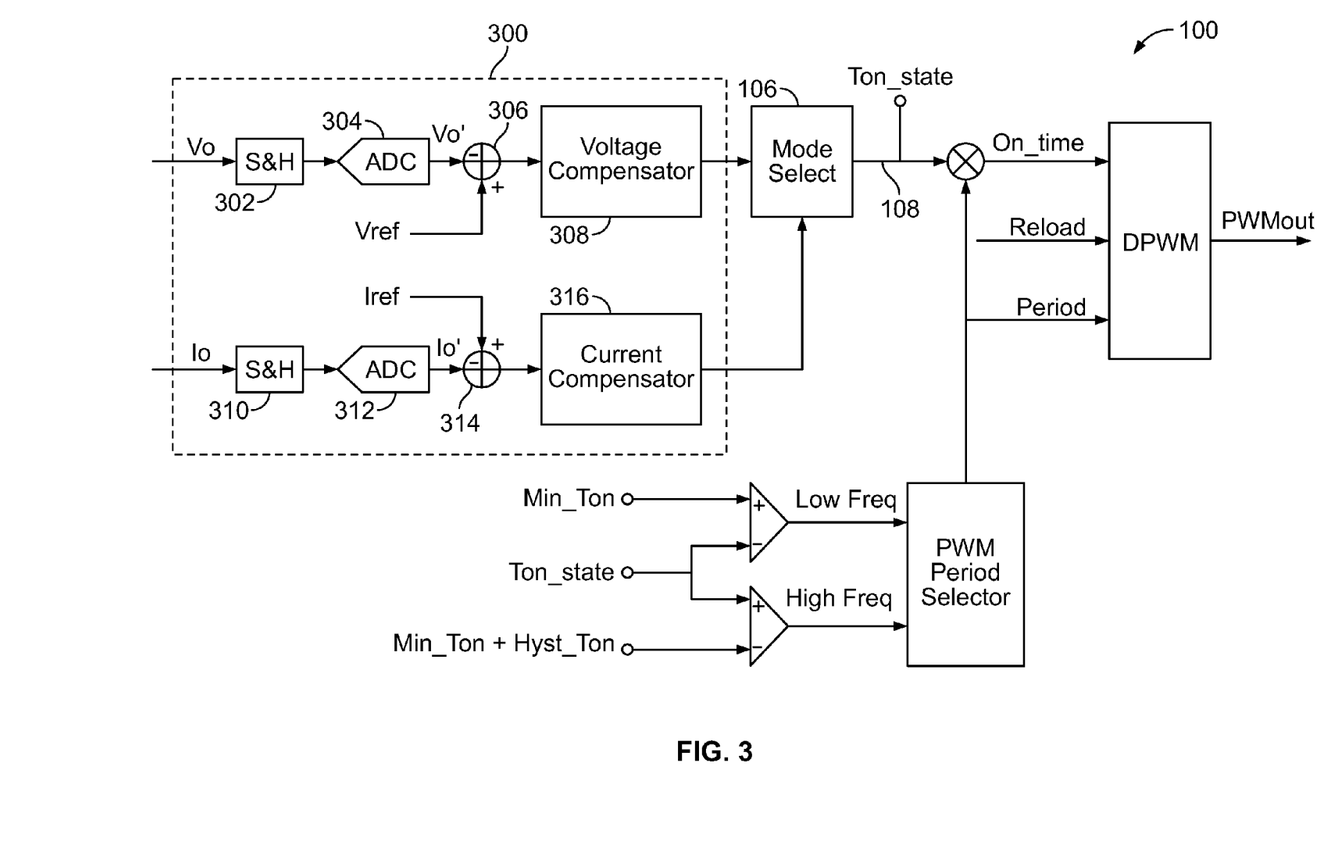
FIG. 3 is an another example switch controller circuit.

FIG. 3 discloses an example of the switch controller 100 having one or more stabilizing circuits, shown with in dashed box 300. The output voltage $V_o$ and/or the output current $I_o$ may be stabilized before the signals are applied to the mode selector 106. The switch controller 100 may further include at least one signal stability control circuit for producing at least one of a stabilized power converter output voltage and a stabilized power converter output current as an input to the mode selector 106. Alternatively, the switch controller 100 may include both the stabilized power converter output voltage and the stabilized power converter output current as inputs to the mode selector 106, as shown.

A voltage signal stability control circuit may include a sample and hold circuit 302 with an output connected to an analog-to-digital converter 304 that produces a digitized sample $V_o{'}$ of the analog power converter output $V_o$. An adder 306 adds the $V_o{'}$ signal to a reference voltage, $V_{ref}$, producing an output connected to a voltage compensator 308. An output of voltage compensator 308 is then applied to mode selector 106. A current signal stability control circuit may be formed of parts that correspond to the voltage signal stability control circuit, including a sample and hold circuit 310, an analog-to-digital converter 312, an adder 314, and a current compensator 316.

A few operation examples of a buck converter 200 or a variant converter with the switch controller 100 and each having a minimum operating on-time of 500 nanoseconds (ns) to provide stable continuous mode, non-burst operation follows. When the minimum operating on-time is reached or approached the operating switch frequency is reduced while maintaining the current duty cycle by increasing the operating on-time and the cycle time essentially simultaneously. Maintaining the duty cycle while decreasing the switching operating frequency minimizes or eliminates any effects on power converter regulation.

If a forward converter has a 12 volt (V) nominal operating output voltage $V_o$, a 100 amp (A) nominal operating output current $I_o$, a 35% nominal operating duty cycle, and a 200 kHz nominal switching operating frequency, then when operating at nominal values in CCM mode, the switch on-time is 1750 ns (35%/200 kHz). If this converter is operated in constant current mode at 100 A with a load impedance of 0.1 Ohm, the output voltage, $V_o$, will fall to 10 V (100 A*0.1 Ohm) causing the converter to operate at a 29.167% duty cycle (35%*10 V/12 V), which equates to an on-time of 1458 ns (29.167%/200 kHz). If the load current is next reduced to 30 A during operation, the output voltage $V_o$ will drop to 3 V (30 A*0.1 Ohm) and the operating on-time must reduce to 438 ns (35%*(3V/12V)/200 kHz) and a duty cycle of 8.75% (35%*3 V/12 V) to follow the buck equation. Because 438 ns is below the predetermined or set minimum operating on-time the converter transitions into burst mode without the benefit of the disclosed example switch controller. As is well known, burst mode results higher ripple in load current $I_o$. To avoid this, the switch controller 100, during current ramp down time, when the on-time reaches or approaches 500 ns, the switching operating frequency is reduced, for example from 200 kHz to 170 kHz. Due to the increase in total period cycle time of the lower switching operating frequency, at same duty cycle of 8.75%, the operating on-time increases to about 514 ns (8.75%/170 kHz), above the minimum operating on-time. Thus, continued stable control and operation in continuous mode is maintained, even at a very low load resistance and low output load current.

As explained above, the reduction in switching frequency may be done gradually as the output voltage reduces or can be done in one step. During the switching frequency change, the duty cycle is held constant. For example, if the switching operating frequency is 200 kHz, with a duty cycle of 10% then the on-time is 500 ns, equal to the minimum operating on-time. Then, if the switching operating frequency is changed to 195 kHz, the operating on-time is increased to 512.8 ns to keep the resultant duty cycle unchanged at 10%. If the switching operating frequency is changed in small steps, e.g. 10 ns steps or the highest resolution of PWM 102, or in steps from about 1-5 kHz, there will be negligible disturbance in output current $I_o$ or voltage $V_o$. If the change is done in a single large step, e.g. from 200 kHz to 100 kHz increasing the on-time by 500 ns, a change in the inductor ripple current at lower the lower switching operating frequency may cause a disturbance at the output current $I_o$ that will settle quickly. The ripple current change is likely to remain within regulation limits, e.g. ±2, and, depending on the regulation requirements, may still be acceptable and, if such a change is not acceptable then a multiple step frequency change is recommended. The choice of using one or multiple switching operating frequency reduction steps to achieve a stable operating on-time depends upon the intended application and its design parameters.

Another example demonstrates the applicability of the examples disclosed involves the operation of a voltage regulator module (VRM) typically used in computing applications. If the power converter is operated as a voltage source and the application requires a wide range of trimming of output voltages $V_o$, the same technique described above may be used and in a simpler manner. When the output voltage Vo is reduced (trimmed), a typical prior art VRM experiences a significant drop in efficiency as Vo drops from for example a nominal output voltage of 5 V to a low output voltage of 0.8 V, as explained above. Using the disclosed examples the power converter efficiency may be improved. The following example demonstrates the improved efficiency for a VRM but is equally applicable to other buck and buck variant converter operated as a variable, trimmed voltage source.

A typical VRM buck converter may have a $V_o$ from 0.8V to 5V, at a defined load or output current $I_o$, with an input voltage of 12 V. The operating duty cycle at 5V and 0.8V can be given by the buck converter equation 1 as:

$$D=5V/12V=0.4167 \text{ and } D=0.8V/12V=0.0667$$

For a nominal switching operating frequency of 500 kHz, the buck switch S1 on-times will be 833.4 ns at 5 V and 133.4 ns at 0.8 V. The drive power and switching losses are both functions of switching operating frequency. Thus, an output power of the power converter for a load current $I_o$ of 25 A at a $V_o$ of 0.8 V is 20 W (25 A*0.8 V) while the output power is 125 W at a $V_o$ of 5 V. This drive power loss over the output voltage range along with the switching losses cause the power converter efficiency to degrade as $V_o$ is reduced. Because of propagation delays and possibly PWM resolution, burst mode operation is inevitable at low $V_o$ levels, resulting in unacceptable ripple.

Using the examples disclosed above, the switching operating frequency may be automatically reduced based on a configured output voltage. The $V_o$ levels at which the switching operating frequency is reduced may be sensed and used as a feedback signal directly to a period selector. The required switching operating frequency level for a variety of $V_o$ levels may be determined by empirical or simulated testing of the converter to identify a reduced switching operating frequency that produces an inductor ripple current that meets the specification requirements while improving the and overall VRM conversion efficiency.

It is noted, because the output inductor and capacitors are maintained, there is no significant impact on the converter bandwidth, if the switching operating frequency is at least five times higher than the converter bandwidth. Typically a one decade frequency difference is recommended.

Consider a VRM example where $V_{in}$=12V, $V_{out}$=0.8V-5V, the switching operating frequency=500 kHz, the output inductor=500 nanohenries (nH), a nominal output current=25 A. When $V_o$ is programmed and set at 5V, the inductor ripple current will be:

$$(5V*(1-0.4167))\div(500 \text{ kHz}*500 \text{ nH})=11.666 \text{ A}$$

The same converter programmed to operate at $V_o$=0.8V, will have an inductor ripple current of:

$$(0.8V\times(1-0.0667))\div(500 \text{ kHz}\times500 \text{ nH})=2.98 \text{ A}$$

Because the VRM output filter capacitors are same for the entire range of possible $V_o$ settings, the output ripple for a 0.8V output is almost a quarter of the output ripple at a 5V output. However, based on typical VRM specifications, the peak-to-peak ripple is relatively constant across the output voltage range. This consistency allows for a switching operating frequency reduction from the nominal 500 kHz to 125 kHz at 0.8V output. This switching operating frequency reduction significantly reduces the switching losses and mosfet drive power losses and thus, improves the power conversion efficiency at lower output voltages. It is believed that for real-world application for this example, the best results will be obtained at a switching operating frequency in between the nominal 550 kHz and 125 kHz when other factors such as core losses in the inductor are considered. The best switching operating frequencies for various lower output voltage settings may be determined through empirical or simulated testing and the control may be implemented in analog or digital. For analog control, changing the switching operating frequency of the converter may be implemented by switching between various timing components; while digital control is accomplished by setting appropriate registers.

For VRMs, the change in the output voltage setting is only needed once and is known at the time of configuration. Thus, the switching operating frequency may be changed permanently for a given required output voltage. As indicated above, for best results, it is believed that the switching operating frequency reduction should be limited to an order of magnitude higher than the converter's control loop bandwidth. For example, if the control loop bandwidth is 20 kHz, then the switching operating frequency reduction should be limited to about 200 kHz to ensure that the switching ripple is filtered properly.

The above disclosed examples may be realized in analog or digital control techniques. For digital control, the required computations to maintain the operating duty cycle easily accomplished. Digital control also allows for a smooth reduction of switching operating frequency using multiple small frequency step downs. Analog control requires selection and installation of the timing components before assembly of the switch controller and the transition from the nominal switching operating frequency to the lower switching operating frequency may be viewed as a reflection on the power converter output. The acceptable level of disturbance to the output ripple depends on the application requirements.

The disclosed example embodiments achieve the best results when applied to voltage mode control applications. This is because the examples directly control the operating duty cycle of the converter and duty cycle is independent of the switching operating frequency, the inductance value, or load impedance when operating in CCM. However, the disclosed examples may also be useful in peak current mode control. Even though the average output current changes with ripple current and is a function of the inductance value and switching operating frequency resulting in a change in the peak current limit level requiring an error amplifier correction, the switching operating frequency reduction may still be achieved with some minor disturbance on the output.

Figure 4:
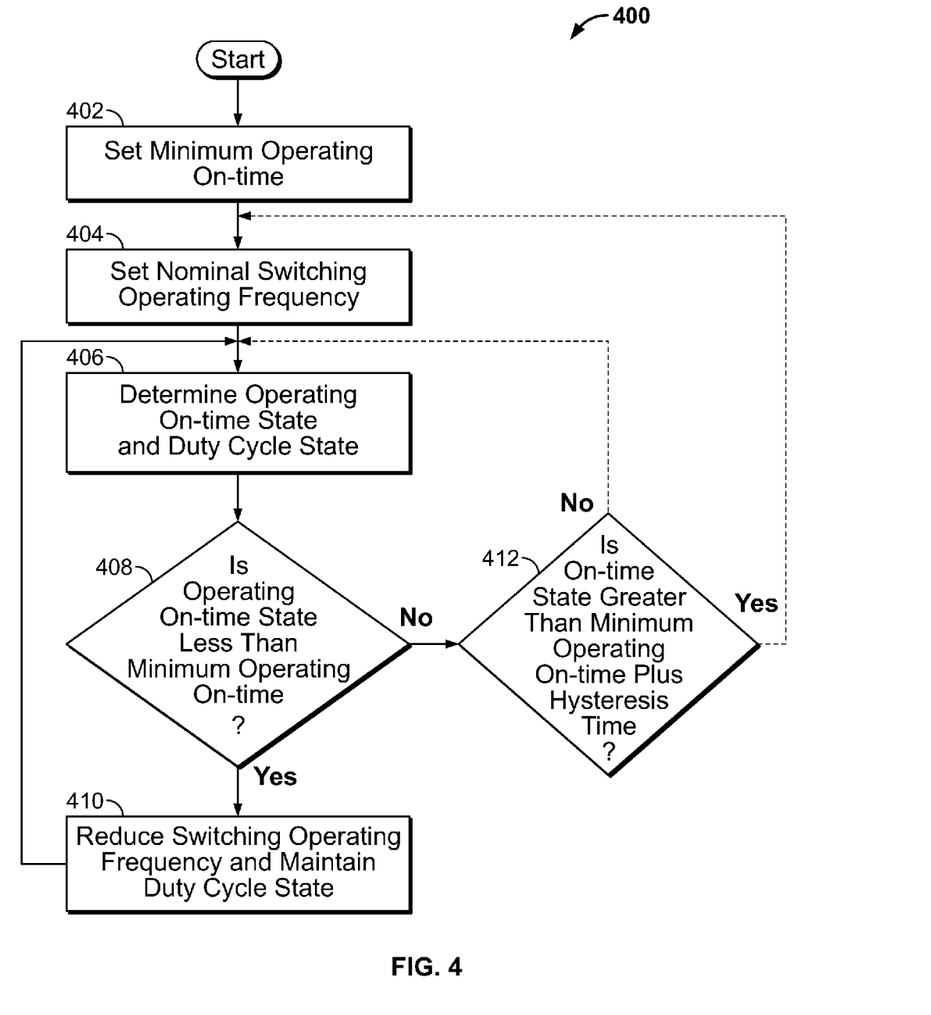
FIG. 4 is an example logic flow for an example method.

FIG. 4 sets forth an example logic flow of a method 400 of controlling a switching operating frequency of a buck or buck variant power converter having a variable output voltage. 402 sets a minimum operating on-time. As stated above, the minimum operating on-time may be determined through testing to ensure stable control in constant current mode without a risk of the converter going into burst mode. Next, 404 sets a nominal switching operating frequency, as discussed above. 406 determines or senses an operating on-time state and a duty cycle state of the power converter.

408 then decides if the operating on-time state from 406 is less than the minimum operating on-time set at 402. If 408 is yes, 410 reduces the switching operating frequency set at 404 while maintaining the duty cycle state determined at 406. The logic then loops back to 406 to continue the process. The frequency reduction at 410 may be a single reduction to a minimum switching operating frequency that will provide an on-time above the set minimum or it may be a smaller reduction that achieves an acceptable on-time over multiple steps. It is noted that a multiple step frequency change obviously slows the transition to the new required operating frequency and provides a very stable output during the transition. A single step frequency change is implemented very fast, while possibly inducing some transient disturbance of the output parameters. If 408 is no, the no switching operating frequency reduction takes place and the logic may loop back to 406 or, optionally to 412 shown in dashed line form and described below.

The disclosed example method 400 is applicable to power converters that are one of a buck converter, a forward converter, a half-bridge converter, a full-bridge converter, an interleaved forward converter, or other buck variant converter.

The example method 400 may further include resetting the switching operating frequency to the nominal switching operating frequency after the determined operating on-time state is greater than the minimum operating on-time by a predetermined amount or hysteresis time. This is accomplished at 412 where if the on-time state at 406 is not greater than the minimum operating on-time set at 402 the method loops back to 406. If, at 412, the on-time state at 406 is greater than the minimum operating on-time at 402 plus a hysteresis time, the method loops back to 404 and resets the switching operating frequency to the nominal value. As discussed above the hysteresis time is added to the set minimum operating on-time to account for any delays and on-off switching times of the power converter to ensure a smooth transition back to the nominal switching operating frequency.

As explained above, it is believed that the best results may be achieved when the switch controller is implemented as a digital switch controller.

Similar to the switch controller disclosed above, the switch controller of the example method 400 may further include setting a reload signal (not shown in FIG. 4) at an end of each pulse width modulated cycle to ensure that a change in the switching operating frequency is made essentially simultaneously with a change in the operating on-time state.

The above disclosed example switch controllers and methods may improve VRM efficiency, allow variable output voltage power supplies to operate at lower output voltages without going into burst mode, improve converter regulation and lower output ripple, and provide improve control of output current. The disclosed examples are applicable to buck and buck variant converts including VRM buck converters used on motherboards for powering computer processors and memory chips, industrial precision current sources, precision instrumentation power supplies, bench power supplies, etc.

The description of the present disclosure is merely exemplary and those skilled in the art will appreciate that variations other than those described will fall within the scope of the present disclosure.

Examples are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that examples may be embodied in many different forms and that neither should be construed to limit the scope of the disclosure. In some examples, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The invention claimed is:

1. A switch controller for a power converter having a variable output voltage range comprising:
   a pulse width modulator having an output producing a pulsed signal for driving a power converter switch;
   a mode selector having an output indicative of an operating on-time state of the power converter connected to a multiplier;
   a period selector having an output indicative of a cycle time for the pulsed signal connected to the multiplier and to an input of the pulse width modulator;
   the multiplier having an output indicative of a switch on-time of the cycle time connected to another input of the pulse width modulator;
   a comparator having an output indicative of the operating on-time state relative to a minimum operating on-time and connected to an input of the period selector; and
   wherein the period selector outputs a nominal cycle time to the pulse width modulator when the operating on-time state is greater than the minimum operating on-time and wherein the period selector outputs an updated cycle time greater than the nominal cycle time when the operating on-time state is less than the minimum operating on-time such that the pulse width modulator outputs a pulsed signal with the updated cycle time and a duty cycle equal to a duty cycle of an immediately preceding pulsed signal.

2. The switch controller of claim 1 wherein the power converter is one of a buck converter, a forward converter, a half-bridge converter, a full-bridge converter, and an interleaved forward converter.

3. The switch controller of claim 1 wherein the comparator has another output indicative of the operating on-time state relative to the minimum on-time plus a hysteresis time, the another output is connected to another input of the period selector and wherein period selector reverts to output the nominal cycle time when the operating on-time state is greater than the minimum on-time plus the hysteresis time.

4. The switch controller of claim 1 implemented as a digital switch controller.

5. The switch controller of claim 1 further including a reload signal applied to the pulse width modulator at an end of each cycle time to ensure that a change in cycle time is made essentially simultaneously with a change in operating on-time state.

6. The switch controller of claim 1 further including at least one signal stability control circuit for producing at least one of a stabilized power converter output voltage and a stabilized power converter output current as an input to the mode selector.

7. The switch controller of claim 6 further including both the stabilized power converter output voltage and the stabilized power converter output current as inputs to the mode selector.

8. A method of controlling a switching operating frequency of a power converter having a variable output voltage range comprising the steps of:
   setting a minimum operating on-time;
   setting a nominal switching operating frequency;
   during operation of the power converter, determining an operating on-time state and a duty cycle state; and
   if the determined operating on-time state is less than the minimum operating on-time, reducing the switching operating frequency and maintaining the duty cycle state.

9. The method of claim 8 wherein the power converter is one of a buck converter, a forward converter, a half-bridge converter, a full-bridge converter, and an interleaved forward converter.

10. The method of claim 8 further including resetting the switching operating frequency to the nominal switching operating frequency after the determined operating on-time state is greater than the minimum operating on-time by a predetermined amount.

11. The method of claim 8 implemented as a digital switch controller.

12. The method of claim 8 further including setting a reload signal at an end of each pulse width modulated cycle to ensure that a change in the switching operating frequency is made essentially simultaneously with a change in the operating on-time state.

\* \* \* \* \*